(12) United States Patent
Matsuo et al.

(10) Patent No.: US 6,381,554 B1
(45) Date of Patent: Apr. 30, 2002

(54) METHOD OF PREDICTION TIME-SERIES CONTINUOUS DATA AND A CONTROL METHOD USING THE PREDICTION METHOD

(75) Inventors: Shigeki Matsuo, Nagoya; Isamu Kawawada, Okazaki, both of (JP)

(73) Assignee: NKS Co., Ltd., Nagoya (JP)

( * ) Notice: Subject to any disclaimer, the term of this patent is extended or adjusted under 35 U.S.C. 154(b) by 0 days.

(21) Appl. No.: 09/127,066

(22) Filed: Jul. 31, 1998

(30) Foreign Application Priority Data

Sep. 2, 1997 (JP) .............................. 9-237072

(51) Int. Cl.$^7$ .............................................. G06F 15/00
(52) U.S. Cl. ......................................... 702/174; 706/17
(58) Field of Search .......................... 702/174, 79, 3, 702/85; 706/21; 600/301

(56) References Cited

U.S. PATENT DOCUMENTS

| | | | | |
|---|---|---|---|---|
| 5,613,041 A | * | 3/1997 | Keeler et al. ................... | 706/17 |
| 6,030,342 A | * | 2/2000 | Amano et al. ................. | 600/301 |
| 6,032,106 A | * | 2/2000 | Ishii ............................. | 702/85 |
| 6,128,578 A | * | 10/2000 | Sakaino et al. ................. | 702/3 |
| 6,243,696 B1 | * | 6/2001 | Keeler et al. .................. | 706/21 |

FOREIGN PATENT DOCUMENTS

| | | |
|---|---|---|
| JP | 05016637 A | 1/1993 |
| JP | 05062495 A | 3/1993 |
| JP | 07175789 A | 7/1995 |

* cited by examiner

*Primary Examiner*—Robert Beatty
*Assistant Examiner*—Mohamed Charioui
(74) *Attorney, Agent, or Firm*—Davis & Bujold, P.L.L.C.

(57) ABSTRACT

There is disclosed a method of prediction time-series continuous data in which the data is accurately predicted based on measuring points and measured values at the measuring points of the data. From past measuring points t0 to t3 before a prediction point t4, a closest measuring point t3 which is closest to the prediction point t4 is sampled. Past n measuring points before the closest measuring point t3 are also sampled. Subsequently, a predicted value Q4 is determined from an interpolation formula f(t), which can derive a measured value Q3 at the closest measuring point t3 from the closest measuring point t3, i.e., Q3=f(t3) which is prepared from the past n measuring points, the measured values, the prediction point t4 and the predicted value Q4. The method can be implemented in a controller.

18 Claims, 12 Drawing Sheets

FIG. 9

| | AVERAGE OF DIFFERENCES BETWEEN PREDICTED VALUES AND MEASURED VALUES | | DEVIATION OF DIFFERENCES BETWEEN PREDICTED VALUES AND MEASURED VALUES | |
|---|---|---|---|---|
| | CONVENTIONAL PREDICTING | PRESENT PREDICTING | CONVENTIONAL PREDICTING | PRESENT PREDICTING |
| PREDICTING VALUES FOR 2 MINUTES AHEAD | -1.9 | 0.077 | 13.8 | 1.21 |
| PREDICTING VALUES FOR 6 MINUTES AHEAD | -0.4 | 0.40 | 13.7 | 2.66 |
| PREDICTING VALUES FOR 10 MINUTES AHEAD | -0.8 | 1.06 | 13.7 | 3.87 |

FIG. 10

ABSOLUTE VALUE OF DIFFERENCE BETWEEN PREDICTED VALUE AND MEASURED VALUE

|  | MAX | MIN | AVE |
|---|---|---|---|
| PREDICTING VALUES FOR 2 MINUTES AHEAD | 3.11 | 0.0 | 0.944 |
| PREDICTING VALUES FOR 4 MINUTES AHEAD | 5.25 | 0.0 | 1.357 |
| PREDICTING VALUES FOR 6 MINUTES AHEAD | 7.26 | 0.01 | 2.138 |
| PREDICTING VALUES FOR 10 MINUTES AHEAD | 9.24 | 0.01 | 3.301 |

METHOD OF PREDICTION TIME-SERIES CONTINUOUS DATA AND A CONTROL METHOD USING THE PREDICTION METHOD

FIELD OF THE INVENTION

The present invention relates to a method to predict the future data on the basis of the measured data which are continuous in time series.

BACKGROUND OF THE INVENTION

Vertical cylindrical furnaces called cupolas, used to melt gray cast iron for casting, are known in the prior art. Each cupola has a bed of coke at the bottom. Unprocessed metals, coke and flux are thrown into a top of the cupola and melted in the presence of blowing air. The cupola is used to get the good molten metal out of a tap hole. The most important items to control in this process are temperatures, composition, gas content, and the chill of the molten metal. Materials to be thrown into the cupola and factors relative to the air blowing are especially important among the factors which effect the temperature and the composition of the molten metal.

In the cupola, since the added materials gradually move down to the molten metal zone at the bottom, it takes dozens of minutes before the changes brought by the added materials effect temperatures or the composition of the molten metal at the tap hole. This also happens when factors relative to the air blowing change: a time-lag (called dead time) occurs before the changes appear among temperatures and composition of the molten metal at the tap hole. FIG. 11 is a graph which shows the relation between the molten metal temperature and quantity of blown air. As FIG. 11 shows, although the quantity of the blown air increases at the point the dashed line a shows, there is a delay before the temperature of the molten metal rises.

Therefore, in order to get good molten metal regularly from the cupola, it is important to adjust the thrown materials as well as factors relative to the air blowing, while capturing the change of the temperature and composition of the molten metal as soon as possible. In other words, in order to eliminate the above-mentioned time-lag, it is necessary to take into account the dead time (which may be a few dozen minutes), predict the temperature and composition of the molten metal, and adjust the materials to be thrown into the cupola and factors relative to the blowing air in accordance with the prediction.

There are several methods known that can be used to predict such continuously changing data as the above-mentioned molten metal temperature. One of them is a method to classify the transitions of the measured data values as some sort of pattern and predict values by referring to that pattern. Another value prediction method applies the method of least squares to the measured data. There is also a method that includes using multiple regression analysis with the time-lag taken into account, among other methods that use causal relation with the statistical analysis.

However, the above-mentioned classification, least squares, and multiple regression analysis methods are not perfect for predicting. For example, it is especially difficult to predict the value of a few minutes ahead. As a result, workers often control devices such as the above-mentioned cupola which need the predicted value, according to their experience and intuition. FIG. 12 shows the measured value 5 and the predicted value of the molten metal temperature in the cupola plotted on the same time axis by using the multiple regression analysis. As FIG. 12 shows, the predicted value can deviate from the measured value.

SUMMARY OF THE INVENTION

Wherefore, an object of the invention is to precisely determine a predicted value at a future point of time-series continuous data based on measuring points of the time-series continuous data and measured values at the measuring points.

To attain this and other objects, the invention provides a method of predicting time-series continuous data in which plural measuring points and measured values at the measuring points of the time-series continuous data are stored beforehand, and a predicted value of the data at one prediction point is determined via an interpolation formula based on the stored measuring points and measured values.

An interpolation formula as used herein means a curve which correctly passes along each of a series of values measured at corresponding measuring time points, which are used for preparing the interpolation formula, as described later. Known formulas include, for example, Newton's interpolation formula and Lagrange's interpolation formula.

Generally, in an interpolation formula, a value in a measuring period is interpolated by using known measuring points and measured values. In the present invention, the interpolation formula is prepared by using n (natural number) measuring points, known values at the measuring points, a prediction point, and an unknown value at the prediction point. In the interpolation formula, according to the concept of interpolation, the known measured value at the closest measuring point is interpolated from the closest measuring point in the measuring period. Therefore, the unknown value at the prediction point can be determined by counting backwards. As a result, an unknown value outside the known measuring period can be determined by using the interpolation formula.

According to the invention, the measuring points and the values corresponding to those points are first stored beforehand. As an illustration, FIG. 3 shows data measured in time series. In the graph, Q0 is a measured value at a measuring time or point t0, Q1 is a measured value at a measuring time or point t1, and so on for Q2/t2 and Q3/t3. When these four measuring points t0 to t3 and values Q0 to Q3 are stored, a prediction time point is represented by t4.

Next, the measurement point (among the measuring points prior the prediction point) which is closest to the prediction point is sampled. In FIG. 3, point t3 is the measuring point which is closest to the prediction point t4.

An interpolation formula is provided that can derive a value at a closest measuring point from the closest measuring point itself (that is, "measured value=f(closest measuring point)", where the function is the interpolation formula). In FIG. 3, the measured value Q3 can be derived at the closest measuring point t3 in an interpolation formula f(t), that is, Q3=f(t3).

Next, as mentioned, the interpolation formula is prepared from past n measuring points before the closest measuring point, measured values at the measuring points, the prediction point, and the predicted value at the prediction point. In FIG. 3, n=2, which means specifically that two past measuring points t1 and t2 are used, and the measured values Q1 and Q2 at the measuring points t1 and t2 are used. If Lagrange's interpolation formula is used, for example, Lagrange coefficients C1, C2 and C4 (corresponding to time points t1, t2, and t4, respectively) are obtained by differences among the points t1 to t4. Thus $$f(t3)=C1Q1+C2Q2+C4Q4.$$

And, since f(t3)=Q3 (a known value),
Q3=C1Q1+C2Q2+C4Q4 and therefore
Q4 (unknown value)=(Q3−C1Q1−C2Q2)/C4.

According to the present invention, the degree n of the interpolation formula can be optimized.

In the invention, a control method can be realized by using the prediction methods. Specifically, in the control method, the predicted value (from the data entered from a control system) at the prediction point is determined by using one of the prediction methods, and the control system is controlled based on the determined predicted value. Examples of control systems include a power supply control system, an air conditioner control system, or a system to control a cupola or other furnace. As a function for realizing the execution of the prediction or control method in computer system, a program to be activated in the computer system may be provided.

BRIEF DESCRIPTION OF THE DRAWINGS

The invention will be described, by way of example, with reference to the accompanying drawing, in which:

FIG. 9 is an explanatory view comparing the predicted values according to the prediction device in the embodiment with the predicted values according to the conventional method for predicting;

FIG. 10 is an explanatory view showing the prediction precision according to the prediction device in the embodiment;

DETAILED DESCRIPTION OF THE PREFERRED EMBODIMENT

Figure 1:
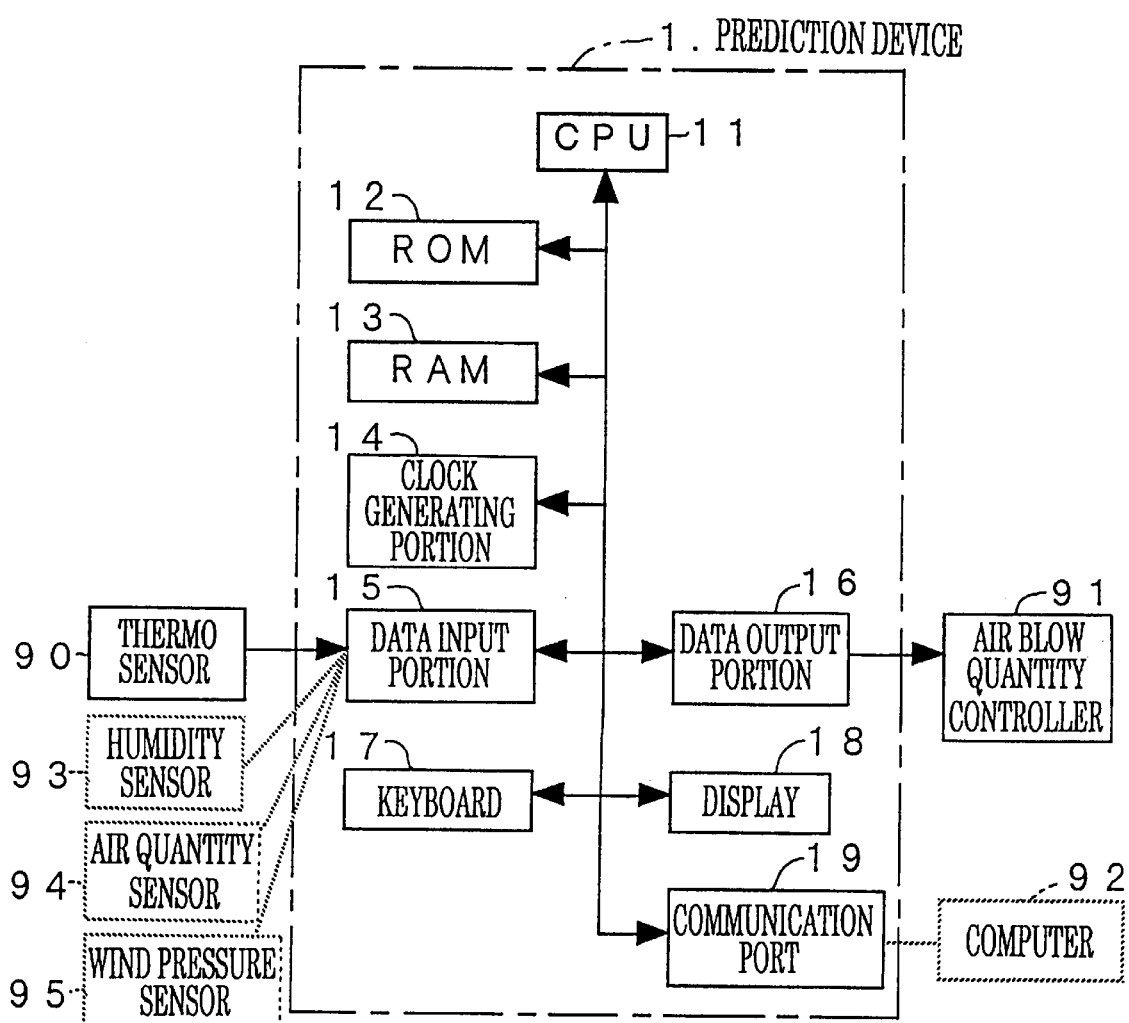
FIG. 1 is a block diagram showing the schematic structure of the prediction device of the embodiment.

FIG. 1 is a block diagram schematically illustrating the construction of the prediction device 1 which predicts the continuous data in time series in an embodiment of the present invention. The prediction device 1 is used to predict the temperature of the molten metal in the cupola. This makes it possible to automatically adjust the quantity of the air to be blown into the cupola. The prediction device 1 samples the measured value input from the thermosensor 90 on the cupola side, determines the predicted value of the molten metal temperature at the tap hole at a certain time and outputs the determined value to the air blow quantity controller 91 on the cupola side.

The prediction device 1 comprises CPU 11 as a control means, ROM 12 as a program memory means, RAM 13 as a temporary memory means, a clock generating portion 14 to provide the clock signal, a data input portion 15 to input the measured values (the time-series continuous data) from the thermosensor 90 outside the prediction device a data output portion 16 to output the predicted values (the time-series continuous data) toward the outside air blow quantity controller 91, a keyboard 17 to input some kind of set prediction value such as the time value a few minutes ahead, a display 18 to display the predicted, the measured and the other set values of the continuous data, a communication port 19 to transmit information to a computer 92 outside the prediction device.

The program (described later) for the prediction process is stored beforehand in ROM 12. RAM 13 is not only the processing work-area for the program stored in ROM 12, but stores the predicted, measured, and other kinds of set values. Via predetermined timing, the clock generating portion 14 outputs the clock signal in order to input the measured molten metal temperature data in the cupola which is continuously transmitted from the sensor 90 to the data input portion 15. The display 18 is an array of LEDs. The computer 92 is connected to the communication port 19 in order to print out the predicted, measured, or other values graphically in such standards as RS485/RS422, RS232C and NeuronChip, for example.

Figure 2:
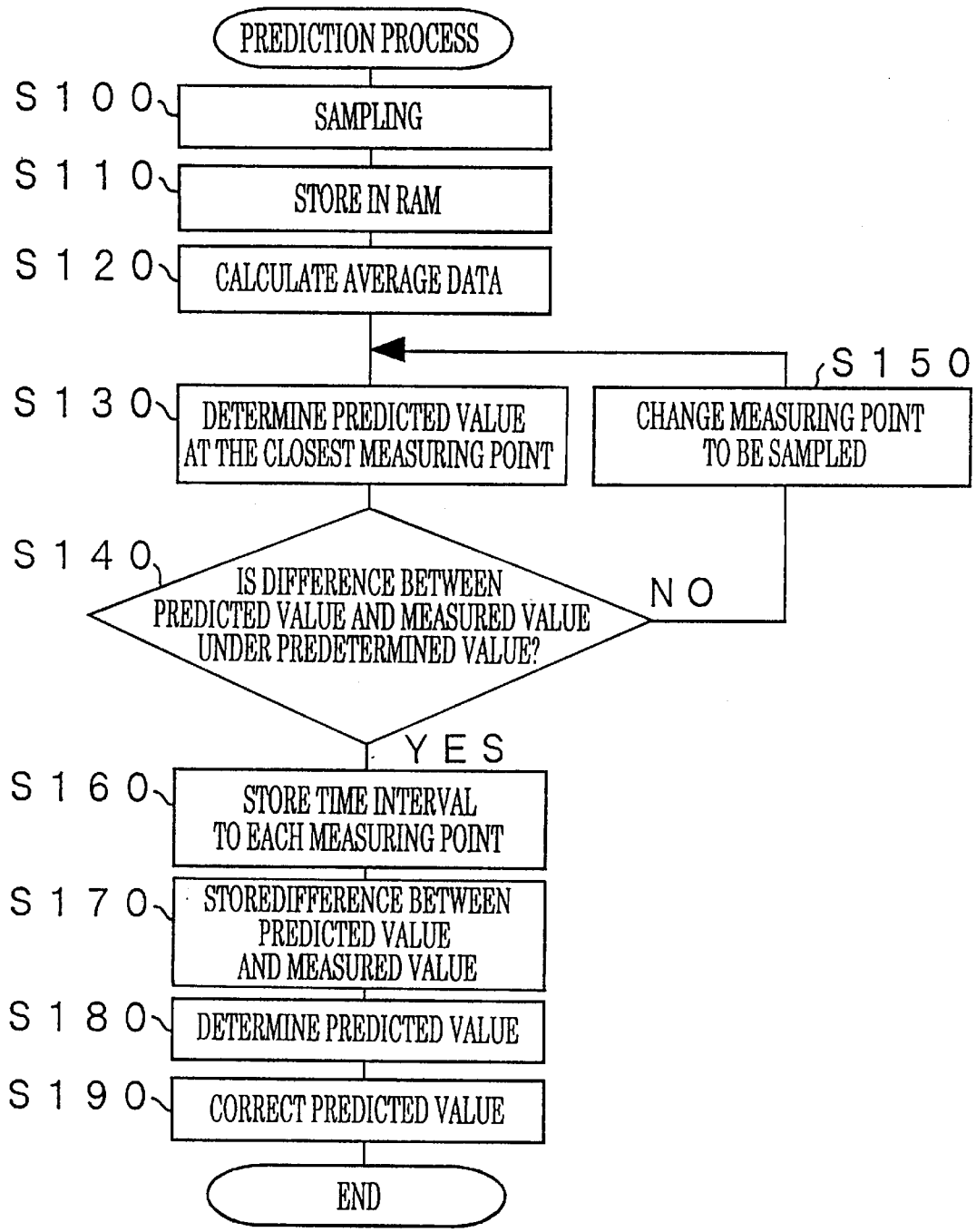
FIG. 2 is a flowchart showing the prediction process according to the prediction device.

The prediction process is now explained referring to the flowchart of FIG. 2. The prediction process is executed by CPU 11, on the basis of the program stored in ROM 12.

At the first step S100, the measured values of the molten metal temperature are sampled. The values measured by the sensor portion 90 are continuously transmitted toward the data input portion 15 which captures them according to the predetermined timing of the clock generating portion 14 clock signal output. Each clock cycle that captures a value corresponds to 'the measuring point', and the captured measured values correspond to 'the measured value at the measuring point'. In this embodiment, the measured values are sampled (captured) every 20 seconds. The sampling point is referred to as the measuring point hereinafter.

After the measured values are sampled, at step S110 the measured values are stored along with the corresponding measuring point in RAM 13. At the next step S120, the measured values corresponding to the measuring points are averaged. In this process, uncertain errors in the measured values are averaged. The average herein is the moving average. The average value is determined by averaging three measured values continuously sampled at each measuring point. For example, suppose that the measured values at the measuring points t1, t2, t3, t4, t5 and t6 in time series are stored in RAM 13. The measured values at the measuring points t4, t5, and t6 are averaged and the moving average value at the measuring point t6 is determined. The measured values at the measuring points t3, t4 and t5 are averaged and the moving average value at the measuring point t5 is determined. The measured values at the measuring points t2, t3 and t4 are averaged and the moving average value at the measuring point t4 is determined.

By the prediction device 1 in the embodiment, the predicted value at a prediction time is determined with the measuring point stored in RAM 13 and the average measured values at the measuring time. The method to determine the predicted value is now explained referring to the explanatory view of FIG. 3, in order to make it easy to understand the process at and after step S130 described later.

Figure 3:
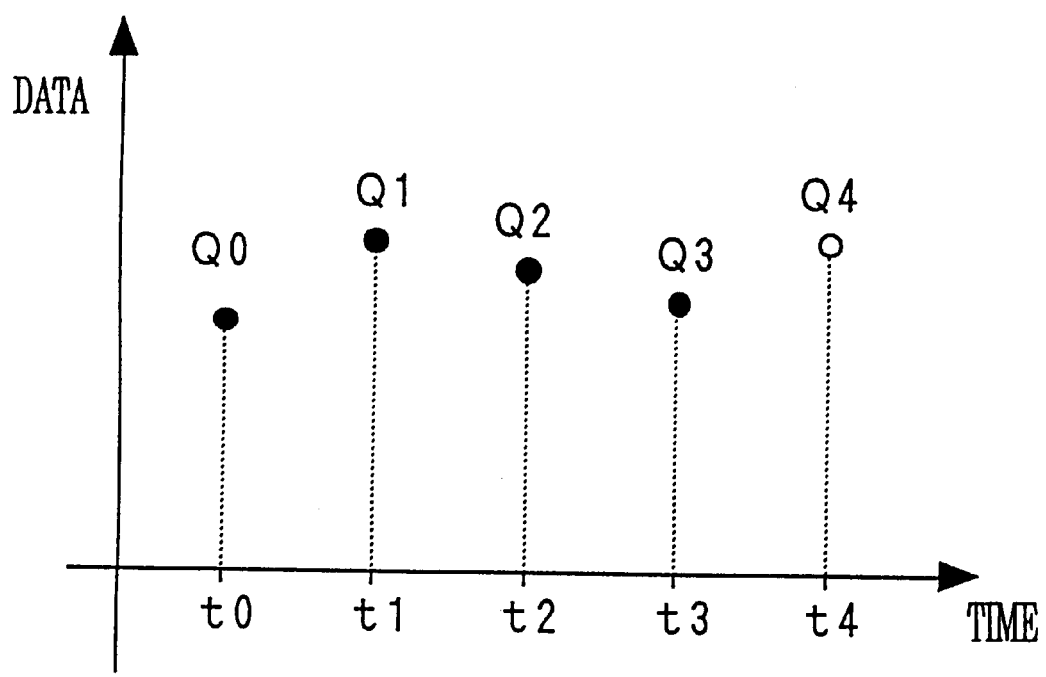
FIG. 3 is an explanatory view to explain the procedure for predicting.

FIG. 3 is an explanatory view showing the measuring points and the measured values of the molten metal temperature at the tap hole of the cupola which are sampled in the time series. Q0 is the measured value at the measuring point to, Q1 for the point t1, Q2 for the point t2, and Q3 for the point t3. The four measuring points and the four measured values are stored. The method to determine the predicted value at the prediction point t4 is now explained.

First, one time which is the closest to the prediction time is sampled among the measuring points t0 to t3 previous to the time t4. This sampled time is referred to the closest measuring point. In this case, the closest measuring point is t3. Next, the past n measuring points before the closest measuring point t3 are sampled. If n equals to 2, the measuring points t1 and t2 are sampled.

Next, the interpolation formula f (t) is determined. The interpolation formula f (t) makes it possible to derive the measured value Q3 from the closest measuring point t3, whereby Q3=f (t3) should hold. The interpolation formula f (t) can be formed from the measuring points t1 and t2, the corresponding measured values Q1 and Q2, the time t4 and the predicted value Q4. The predicted value Q4 is unknown.

If Lagrangian interpolation formula is used, Lagrangian coefficients C1,C2 and C4, respectively at the points t1, t2 and t4, can be found with the difference between t1 and t4 as follows.

$$f(t3)=C1Q1+C2Q2+C4Q4$$

Although the predicted value Q4 is unknown as mentioned above, the measured value Q3 at the measuring point t3 is known and then the following equation should hold:

$$Q3=C1Q1+C2Q2+C4Q4$$

Therefore, the value Q4 is determined as follows:

$$Q4=(Q3-C1Q1-C2Q2)/C4.$$

Generally, interpolation formulas interpolate a measured value in a measuring period having known measuring points and known measured values. In the present embodiment, an interpolation formula is found by using n measuring points and corresponding measured values, the prediction point, and the unknown measured value to be predicted at the prediction point. The interpolation formula interpolates the known measured value at the closest measuring point in the measuring period. To count back the interpolation formula makes it possible to determine an unknown value at the prediction point. Thus, it is possible to determine unknown measured values outside the measuring period with the interpolation formula in the embodiment.

As mentioned, in the embodiment, in order to determine a predicted value, the point which is previous but closest to the prediction point is sampled. Additionally, n measuring points previous to the closest measuring point are sampled.

Furthermore, in the invention, the degree of the interpolation formula is optimized by increasing/decreasing the number n of the measuring points. By raising the degree of the interpolation formula, the determined predicted value based on the measured point largely varies in accordance with the change of the measured value. Therefore, by raising the degree of the interpolation formula, when the data rapidly varies, the predicted value following the data can be determined.

For example, when the variation of the data is the predetermined value or larger, by increasing the number n of the measuring points, the degree of the interpolation formula is raised. On the other hand, when the variation of the data is smaller than the predetermined value, by decreasing the number n of the measuring points, the degree of the interpolation formula is lowered.

That the variation of the data is larger or smaller than the predetermined value means herein that difference between consecutive measured values in time series is larger or smaller than the predetermined value. The magnitude of the variation of the data is determined, for example, by judging whether or not the absolute value of the gradient of the measured values is larger than the predetermined value, or by judging whether or not the average of differences of repeatedly measured values in a predetermined period is larger than the predetermined value.

This "predetermined value" is experimentally determined. A degree is changed when largeness of the variation of repeatedly measured value reaches some value. This process is conducted by using several patterns in which the largeness of the variation of measured values as parameter vary. Differences between predicted values obtained at these patterns and measured values corresponding to the predicted values are compared between the patterns. The "predetermined value" is largeness of the variation of measured values corresponding to such pattern that difference between predicted value and measured value is smallest.

For example, in the above-mentioned cupola, to measure several times per minute is set up. The predetermined value is set up 2° C. If the average in one minute of differences of repeatedly measured values is 2° C. or higher, the degree is raised. On the other hand, if the average is lower than 2° C., the degree is lowered. As a result, predicted values follows measured values well.

However, the above numerical values are only examples among "predetermined values". It should be appreciated that "predetermined values" can be changed on the basis of predictable measurement object or measurement environment. Furthermore, according to requirement by clients, the precision of "predetermined values" can be set up more strictly, for example, considering below a decimal point.

For example, when the variation of the data is the predetermined value or larger, the degree of the interpolation formula is set to three or more. On the other hand, when the variation of the data is smaller than the predetermined value, the degree of the interpolation formula is set to one or two. For example, the moderately varying enthalpy in outside/inside air can be precisely predicted by using the interpolation formula with a degree of two.

The degree of the interpolation formula may be determined based on the variation of the data as aforementioned, but by determining the predicted value the degree can be optimized based on the precision of the predicted value. Specifically, a plurality of predicted values at the closest measuring point are predetermined by using interpolation formulas with different degrees, and the predicted value at the prediction point is determined by using the interpolation formula with the same degree as the degree of the interpolation formula which reduces difference data (data based on the difference between the predicted value and the measured value at the closest measuring point in the interpolation formula).

A step-by-step example is given below:

1) Determine a plurality of predicted values at the closest measuring point (in FIG. 3, t3).

1A) Assume no actual value exists at t3.

1B) Use an interpolation formula with a different degree n to generate each predicted value. For this process, the closest measuring point is regarded as the prediction point, and the past n+1 points before the closest measuring point are sampled. In FIG. 3, the values at t0, t1 and t2 would be sampled if n=2, for example.

2) Determine the "difference data". One point of "difference data" is the difference between a predicted value (using an interpolation formula with a particular degree) and the actual value at the closest measuring point.

3) Note which degree n resulted in the smallest difference value (that is, which n gave a predicted value closest to the actual value).

4) For predicting the value at the actual prediction point, use an interpolation formula having the same degree n as in step 3. Therefore, while the degree is optimized, prediction can be performed. As a result, the precision of the predicted value can be enhanced. Furthermore, when the predicted value is repeatedly determined, the hysteresis of changes in degree may be stored in the unit of days, months or seasons. After the hysteresis of the degree changes is stored, the degree of the interpolation formula may be determined based on the hysteresis.

In the prediction method of the invention, in addition to the closest measuring point, the n measuring points are sampled for prediction, but by changing the sampled n measuring points, the prediction precision can be raised. Specifically, the time interval between the prediction point and each of the n measuring points is optimized. By changing the sampled n measuring points, the influence of the measured point on the predicted value is changed. Therefore, by optimizing the n measuring points, the prediction precision can be enhanced.

Figure 4A:
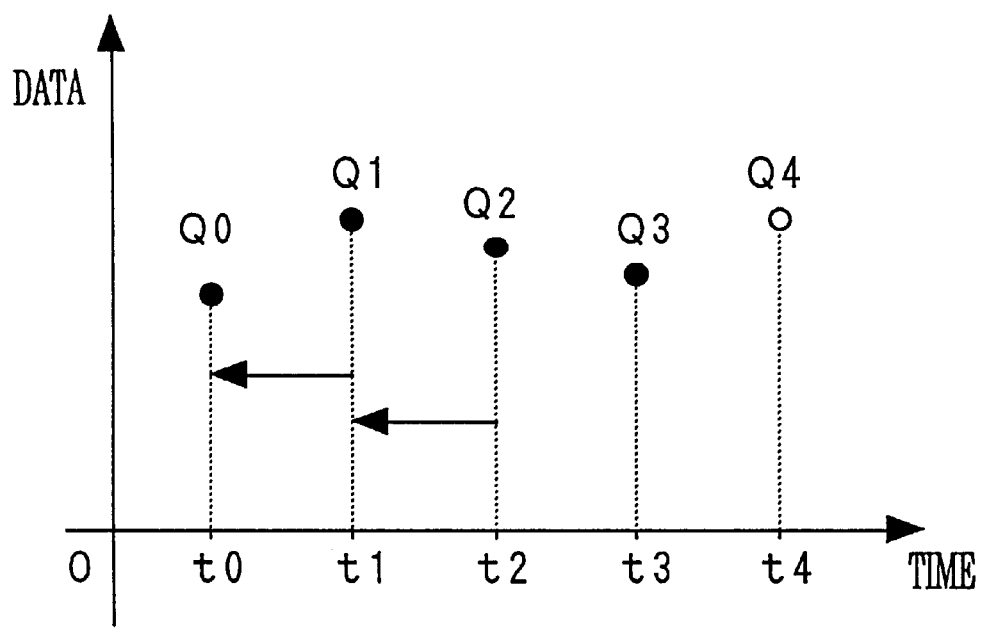
FIGS. 4A, 4B are an explanatory view to explain the procedure by which a chosen measuring point is changed.
Figure 4B:
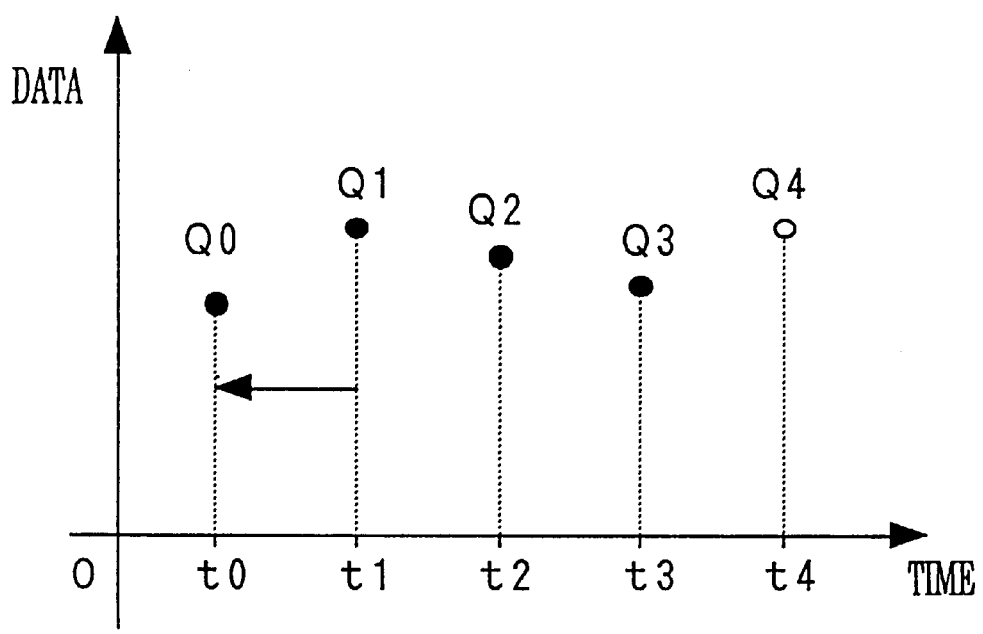

For example, when the variation of the data is the predetermined value or larger, the time intervals are enlarged in total. When the variation of the data is smaller than the predetermined value, the time intervals are reduced in total. In this case, the magnitude of the data variation is determined based on the gradient of the measured values of the data as aforementioned. Here, "the time intervals are enlarged in total" means that the time interval between the prediction point and each of the n measuring points is enlarged. Similarly, "the time intervals are reduced in total" means that the time interval between the prediction point and each of the n measuring points is reduced. In the example of FIG. 3, when the time intervals are enlarged in total, as shown in FIG. 4A, the measuring points t0 and t1 are used instead of the measuring points t1 and t2. Alternatively, as shown in FIG. 4B, the measuring point t2 is used as it is, and the measuring point t0 is used instead of the measuring point t1. In this manner, by relatively enlarging the time interval, the change of the predicted value becomes small relative to the change of the measured value. Therefore, the precision in predicting moderately changing data is enhanced. On the other hand, by relatively reducing the time interval, the change of the predicted value becomes large relative to the change of the measured value. Therefore, the precision in predicting rapidly changing data is enhanced. The total time interval between each of the n measuring points sampled for prediction and the prediction point is hereinafter referred to as "the time intervals of the n measuring points".

As aforementioned, the time intervals of the n measuring points are optimized based on the variation of the data. Alternatively, the predicted value is predetermined and the time intervals of the n measuring points are optimized in such a manner that the precision of the predicted value is raised. Specifically, by repeatedly determining the predicted value at the closest measuring point, the difference data is calculated based on the difference between the predicted value and the measured value at the closest measuring point, the time interval from the closest measuring point is calculated in such a manner that the difference data is further reduced, and the predicted value at the prediction point is determined by using the calculated time interval as the time interval from the prediction point.

In this case, by determining the predicted value at the closest measuring point while changing the n measuring points, the time interval from the closest measuring point to each measuring point is calculated in such a manner that the difference data based on the difference with the measured value at the closest measuring point becomes smaller. Subsequently, the n measuring points are sampled in such a manner that the time interval from the prediction point to each of the measuring points equals the calculated time interval, and the predicted value at the prediction point is determined. Thereby, prediction can be performed while optimizing the time intervals of the n measuring points, and the prediction precision can be enhanced.

Referring to FIG. 2 again, the prediction process from step S130 in the embodiment is now explained.

At step S130, the predicted value at the closest measuring point is determined before the predicted value at the prediction point is determined. This is a preprocess by which are chosen n measuring points to be sampled in order to properly determine the predicted value at a prediction point such as 2 minutes ahead. Suppose that the predicted value at the measuring point t9 two minutes posterior to the closest measuring point t8 is to be determined, with the condition that measuring points corresponding to the measured values are stored in order of t1,t2,t3,t4,t5,t6,t7 and t8 in time increments of 30 seconds. At step S130, the predicted value at the closest measuring point t8 is predetermined. In cases where the predicted value at the prediction time t9 is determined, the closest measuring point t8 and two measuring points prior to t8 are sampled. When the predicted value at the closest measuring point t8 is determined, the measuring point t4 and two measuring points prior to t4 are sampled. Since a two minute time interval exists from the closest measuring point t8 to the prediction time t9, the measuring point t4 from which a two minute time interval exists to the closest measuring point t8 is sampled. And then two measuring points prior to t4 are sampled. In this case, the measuring points t2 and t3 are sampled. In the following explanation, it is assumed that the value at the closest measuring point t8 is already determined with the measuring points t2, t3 and the measured values at the points.

At step S140, it is determined whether or not the difference between the predicted value and the measured value at the closest measuring point is the predetermined value or under. If the difference between the predicted value and the measured value at the closest measuring point is determined to be the predetermined value or smaller (at step S140: YES), step S160 is chosen to proceed. If the difference between the predicted value and the measured value at the closest measuring point is determined to be larger than the predetermined value (at step S140: NO), step S150 is chosen to proceed.

At step S150, the measuring points to be sampled are changed. Measuring points are sampled so that the total time interval from the closest measuring point t8 to each of two measuring points prior to t8 may be longer than the previous time interval. For example, the measuring points t1 and t2 are sampled, instead of the measuring points t2 and t3. And then, the processes from step S130 are repeated. After the measuring point t1 and t2 are sampled, at step S130 the predicted value at the closest measuring point is determined again. In the following explanation, it is assumed that the difference between the predicted value and the measured value at the closest measuring point is determined to be the predetermined value or under (at step S140: YES).

At step S160, the time intervals from the closest measuring point t8 to each of two measuring points t1 and t2 are stored. At step S170, the difference between the predicted value and the measured value at the closest measuring point t8 is stored.

At step S180, two measuring points are sampled so that the time interval from the prediction time t9 is as long as the time interval stored at step S160. In this case, the measuring points t5 and t6 are sampled. With the known measured value at the closest measuring point t8, the value at the prediction time t9 is determined.

At step S190, the predicted value determined at step S180, referring to the difference stored at step S170, is corrected and the whole process for predicting is completed.

The effect of the prediction device 1 in the embodiment is explained next.

Interpolation formulas interpolate the measured value within the measuring period by using the known measuring points and measured values. In the embodiment, as aforementioned, an interpolation formula is found with n measuring points and known measured values at the n measuring points, a prediction time and unknown value to be measured at the prediction time. The unknown value to be measured at the prediction time is determined under the condition that the interpolation formula interpolates the known measured value at the closest measuring point by using the closest measuring point within the measuring period. Thus, the future data at a certain time is predicted by using the interpolation formula of the curve accurately passing along the selected measured values, taking it into consideration that the change in data is continuous, that is, that energy moves continuously. Compared to the conventional methods, the prediction precision is thus greatly improved.

In the embodiment of the prediction device 1, the predicted value at the closest measuring point is predetermined (step S130 in FIG. 2). Sampled measuring points are continuously changed until the difference between the predicted value and the measured value at the closest measuring point reaches the predetermined value or less (step S150 in FIG. 2). When the difference between the predicted value and the measured time at the closest measuring point reaches the predetermined value or less (step S140 in FIG. 2 YES), the time intervals from the prediction time to each measuring point are stored (step S160 in FIG. 2) and then the difference between the predicted value and the measured value is stored (step S170 in FIG. 2). The predicted value is determined with the stored time interval (step S180 in FIG. 2). Furthermore, the predicted value is corrected on the basis of the stored difference (step S190 in FIG. 2).

Thus, the precision of the predicted values at a prediction time can be improved, since the sampled measuring point is optimized.

Figure 5:
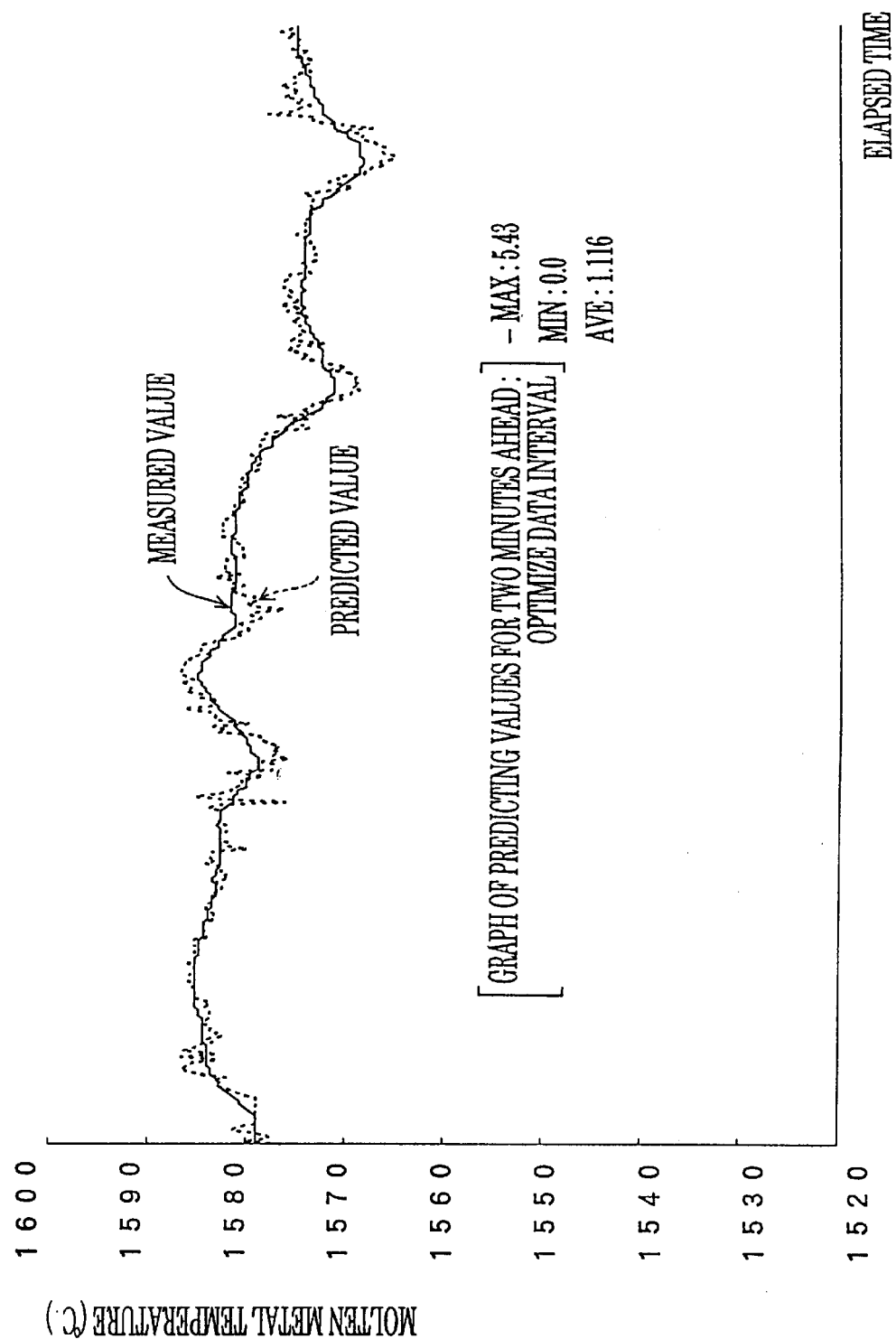
FIG. 5 is an explanatory view showing a comparison of the predicted values and measured values of the molten metal temperature for two minutes ahead.

FIG. 5 shows the comparison of the predicted value and the measured value after the above-mentioned optimization for the time interval of the measuring point. In FIG. 5, the measured values of the molten metal temperature in the cupola and the predicted values of the molten metal temperature in the cupola for two minutes ahead are plotted. The measured values are shown with a solid line, and the predicted values are shown with a dashed line hereinafter. It can be observed that the predicted values move the same as the measured values, even if the time interval exists. The maximum value (MAX) of difference between the predicted value and the measured value is 5.43, the minimum value (MIN) is 0.0 and the average (AVE) of difference is 1.116, with MAX, MIN and AVE being in ° C.

The measured value of the data naturally includes an indeterminate error. When the time intervals of the n measuring points are reduced as aforementioned, a subtle change in the measured value is reflected in the predicted value. Hunting for the predicted value is in part caused by the indeterminate error. To solve the problem, for the measured values at n+1 measuring points including the closest measuring point, an average measured value is obtained by averaging the measured values at m measuring points, in which m is an integer of two or more. For example, the measured values at the m measuring points are moved in time series and averaged. Thereby, the indeterminate errors of the measured values of the data are averaged. Therefore, the prediction precision deterioration, as well as predicted value hunting, both caused by the indeterminate error, can be prevented. This averaging of indefinite difference is done in step S120 in FIG. 2.

Figure 6:
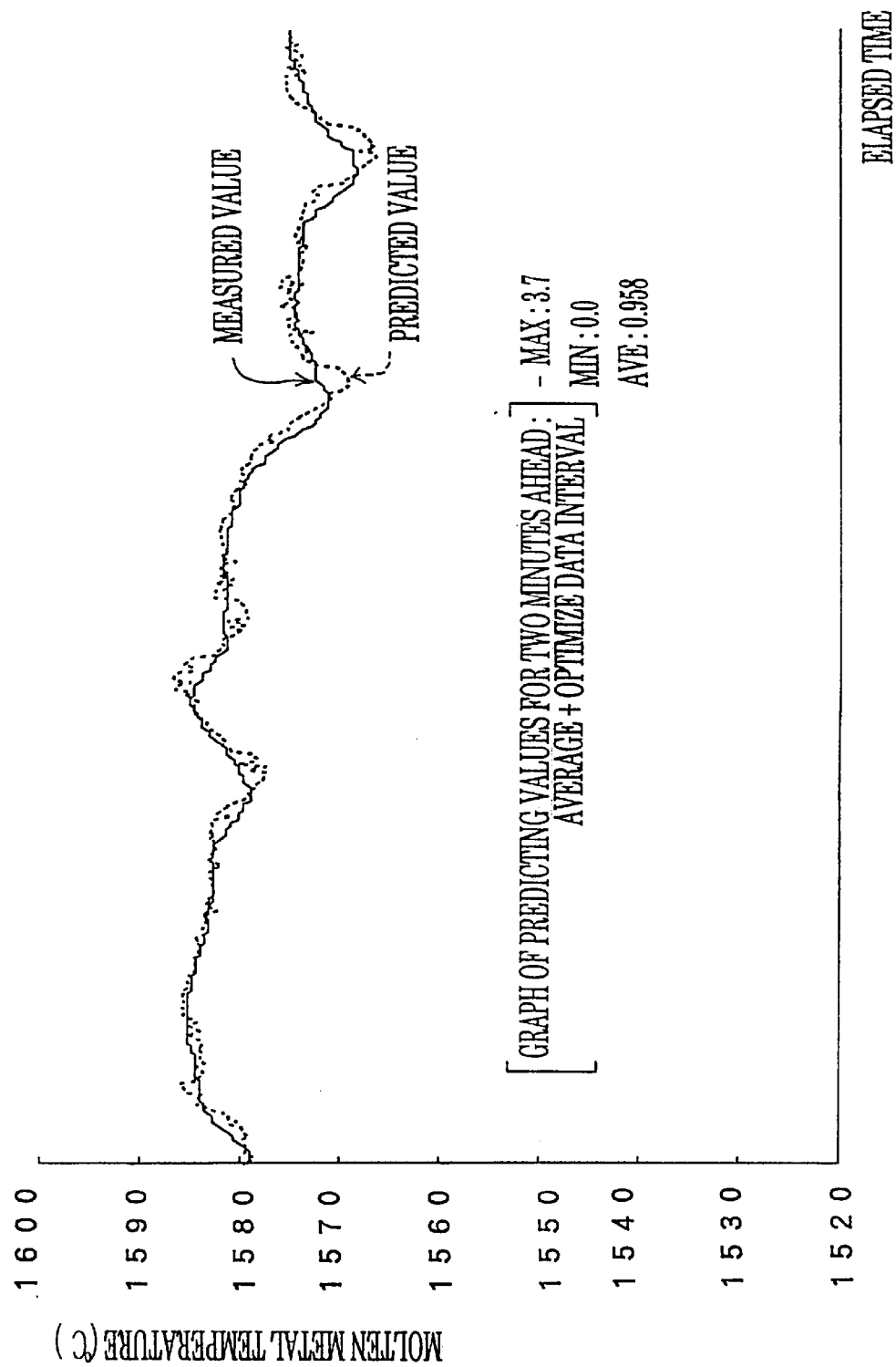
FIG. 6 is an explanatory view showing a comparison of the predicted values and measured values of the molten metal temperature for two minutes ahead.

FIG. 6 shows the comparison of the predicted value and the measured value under the condition that the time interval of the measuring point is optimized as aforementioned and also that the predicted value is determined with the average measured value. In FIG. 6, after the process of moving and averaging every 10 measured values under the conditions for determining the predicted values as shown in FIG. 5, the average measured values and the predicted values determined on the average measured values were plotted. The measured values are shown with a solid line and the predicted values are shown with a dashed line the same as in FIG. 5. The maximum value (MAX) of the difference between the predicted value and the measured value is 3.7, the minimum value (MIN) of the difference is 0.0 and the average (AVE) of the difference is 0.958. In FIG. 6 the total difference between the measured values and the predicted values is smaller than that in FIG. 5. FIG. 6 thus shows an improvement in prediction precision.

In the embodiment of the prediction device 1, if the difference between the predicted value and the measured value at the closest measuring point is less than the predetermined value (step S140 in FIG. 2: YES), the difference is stored in RAM 13 (step S170 in FIG. 2) and a predicted value at a prediction time is corrected on the basis of that difference (step S190 in FIG. 2). Thus, even if the time interval of a measuring point is optimized, since it is rare that the difference between the predicted value and the measured value at the closest measuring point is 0, the predicted value is corrected on the basis of that difference. The prediction precision is thus improved.

When the measured values are averaged, the prediction precision changes depending on the number m of the measured values to be averaged. Then, the number m of the measured values to be averaged is optimized. For example, when the variations in the measured and predicted values are observed in macro manner by repeatedly determining the predicted value, the variation of the predicted value is not much delayed behind the variation of the measured data value by decreasing the number m of the measured values to be averaged. Especially, the delay in the vicinity of data inflection point is lessened, and the prediction precision is enhanced. Here, the inflection point indicates a point at which the data variation changes from decreasing to increasing or from increasing to decreasing.

As aforementioned, the difference data, based on the difference between the predicted value and the measured value, can be reduced by optimizing the degree of the interpolation formula, the time intervals of the n measuring points, and the number m of the measured values to be averaged, but it is rare that the difference data becomes zero. Therefore, in the invention, the predicted value at the closest measuring point is predetermined, the difference data is calculated, and the predicted value at the prediction point is corrected.

Figure 7:
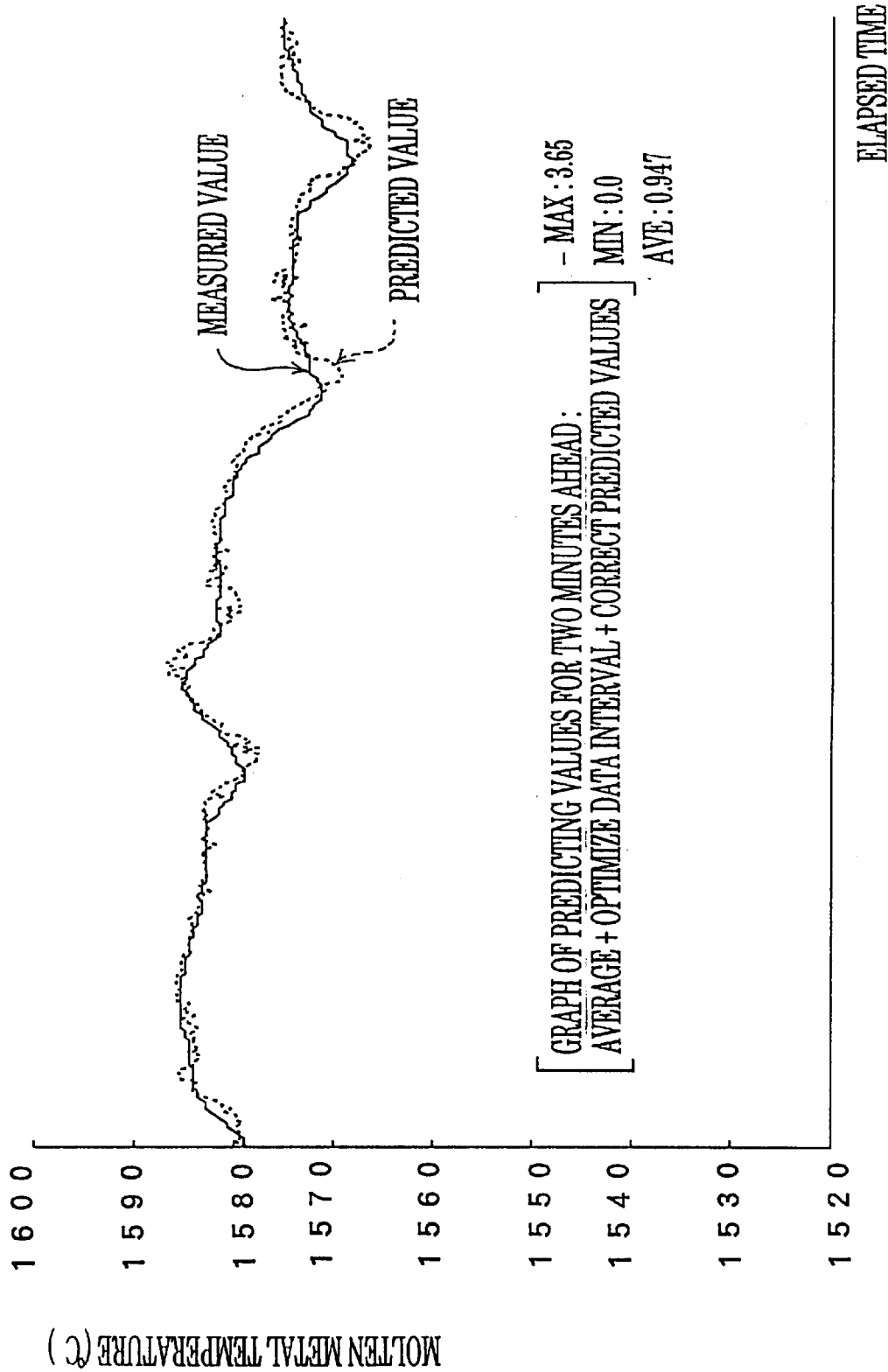
FIG. 7 is an explanatory view showing a comparison of the predicted values and measured values of the molten metal temperature for two minutes ahead.

FIG. 7 shows the comparison of the predicted value and the measured value when the predicted value is determined with the correction of the above-mentioned difference, under the condition that the time interval of the measuring points are optimized and the measured values are averaged. In FIG. 7, the predicted values, which are already corrected on the basis of the difference between the predicted values and the measured values, are plotted along with the measured values, under the same conditions used to determine the predicted values in FIG. 6. The maximum value (MAX) of the difference between the predicted value and the measured value is 3.65, the minimum value (MIN) of the difference is 0.0 and the average (AVE) of the difference is 0.947. It can be seen that the prediction precision is more improved than in FIG. 6. FIG. 7 also shows that the predicted value advances in time near the inflection point of the measured value when observed in macro manner.

Figure 8:
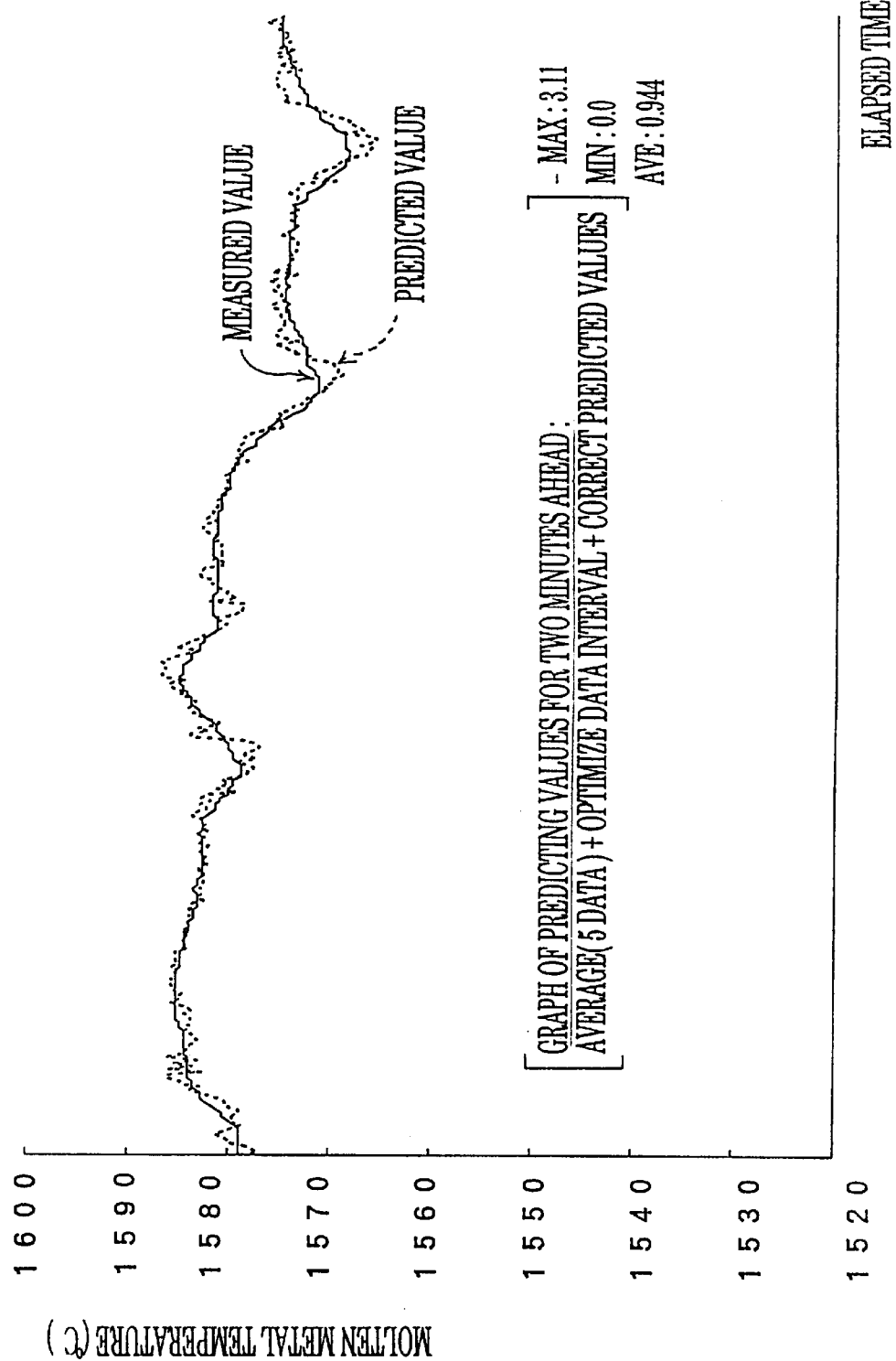
FIG. 8 is an explanatory view showing a comparison of the predicted values and measured values of the molten metal temperature for two minutes ahead.
Figure 11:
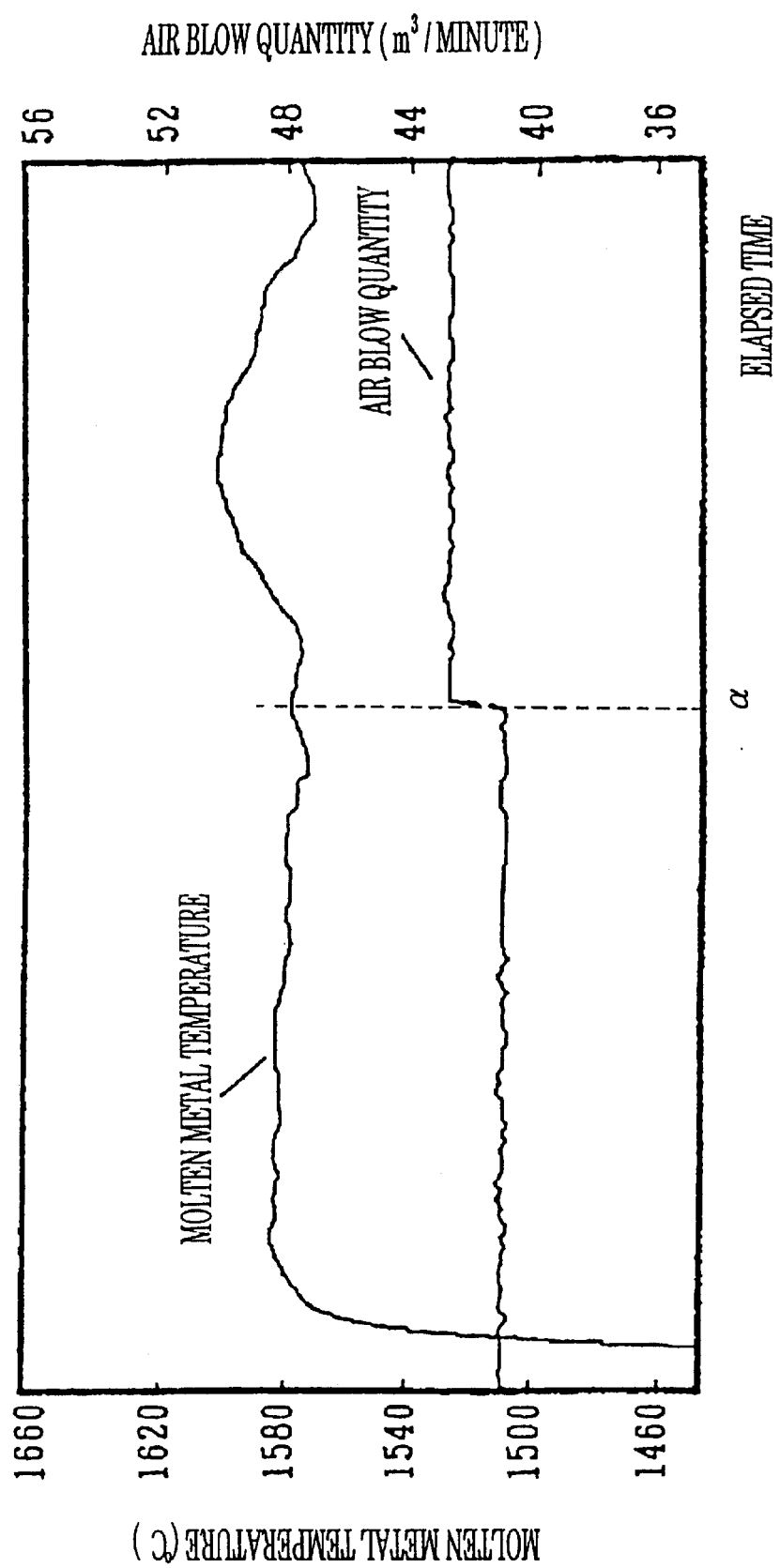
FIG. 11 is an explanatory view showing that the increase of air blow quantity influences the molten metal temperature.
Figure 12:
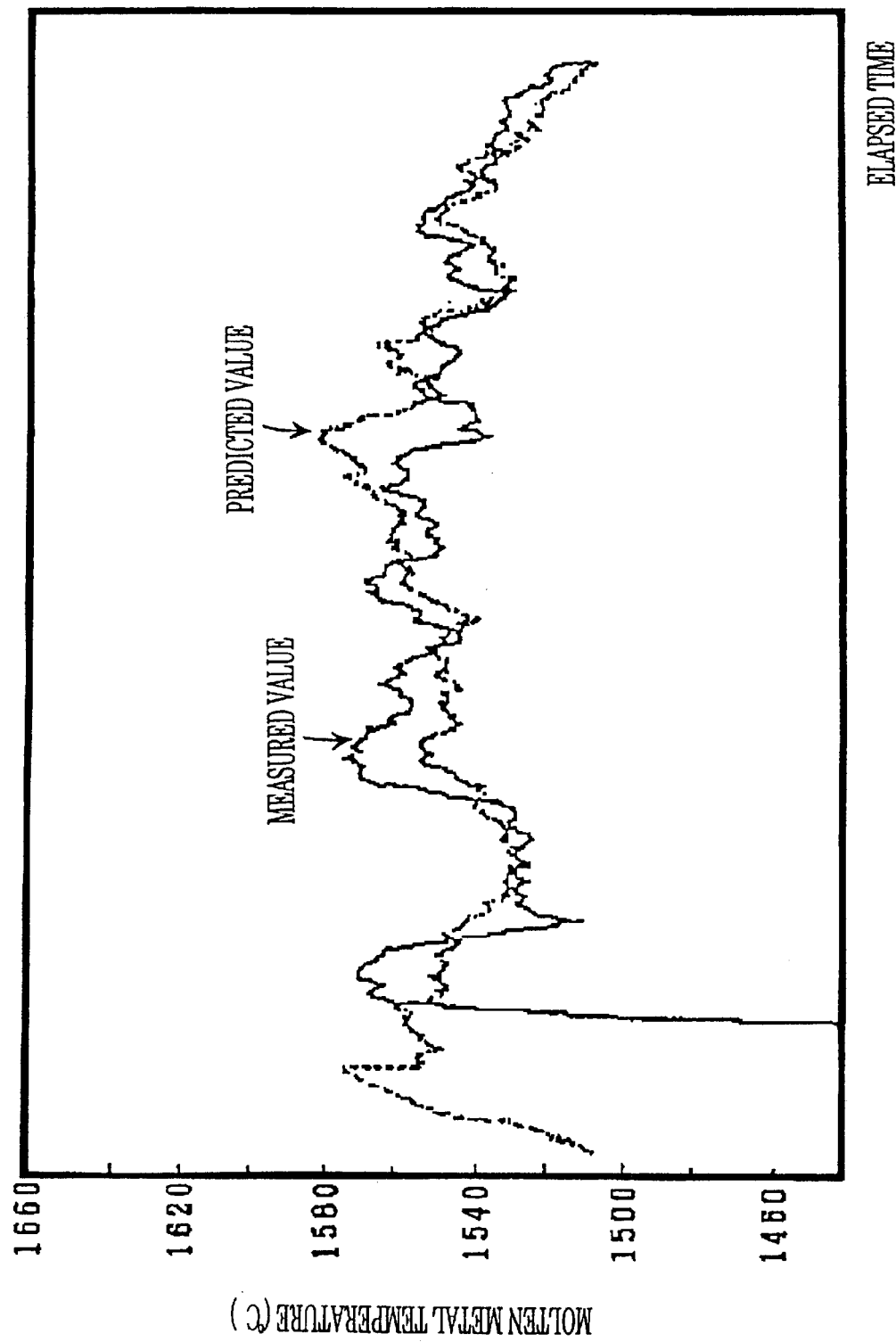
FIG. 12 is an explanatory view showing a comparison of the predicted values of the molten metal temperature for five minutes ahead and the measured values of the molten metal temperature according to the conventional method for predicting.

As aforementioned, for comparing FIGS. 5, 6 and 7, ten measured values are moving averaged and the moving average value is used as a measured value to predict a value. However, by decreasing the number of measured values for averaging, any time-lag between the predicted value and the measured value can be overcome. In FIG. 8, after five measured values are moving-averaged, prediction is performed with the moving average value as the measured value. As a result, a better comparison between the predicted value and the measured value can be obtained. The maximum value (MAX) of the difference between the predicted value and the measured value is 3.11, the minimum value (MIN) of the difference is 0.0 and the average (AVE) of the difference is 0.944.

FIG. 9 compares a prediction done by multiple regression analysis and a prediction done by the prediction device 1 of the embodiment. FIG. 9 is a table which shows the average difference between predicted values and measured values and the deviation of difference between predicted values and measured values, with prediction repeatedly performed two, six and ten minutes later by using each prediction method. As shown in FIG. 9, with respect to the deviation of the differences, the prediction precision is improved by one order of magnitude. In addition, FIG. 10 shows the precision of the prediction device 1 of the embodiment, as numerical values. FIG. 10 is a table which shows the maximum value (MAX), the minimum value (MIN) and the average (AVE) of the difference between predicted values and measured values, when predicted values which were predicted for two, six and ten minutes later are repeatedly determined.

The difference data may be predicted by repeatedly determining the predicted value and obtaining the difference data at each measuring point. Specifically, the predicted value at each measuring point is predetermined, and the difference data, based on the difference between the predetermined predicted value and the measured value at each measuring point, is calculated. The difference data for each measuring point is stored, the predicted value at the prediction point is determined, the predicted difference data at the prediction point is also determined, and the predicted value at the prediction point is corrected based on the predicted difference data.

In this case, the difference data at each measuring point is calculated by predetermining the predicted value at each measuring point. In the same manner as when the predicted value is determined, the predicted difference data at the prediction point is determined based on the measuring points and the difference data at the measuring points. Subsequently, the predicted value is corrected based on the predicted difference data. The prediction precision can thus be raised further. Especially, when the prediction point is far from the closest measuring point and the relevant data is temperature, humidity or another data which modulates largely, the precision of the predicted value is raised.

Additionally, the predicted value largely deviates from the measured value in the vicinity of the data inflection point. In the invention, when the inflection point of the data is determined, the predicted value at the prediction point may be determined by relatively reducing the time interval from the prediction point to each of the n measuring points. Here, the inflection point of the data is determined based on the gradient of the measured values, based on the gradient of the deviation between the measured value and the predicted value, or based on a change ratio of the deviation between the measured value and the predicted value.

In this case, the time intervals of the n measuring points are reduced. As a result, the prediction precision in the vicinity of the inflection point can be raised. Furthermore, the prediction precision in the vicinity of the inflection point can be enhanced by selecting the prediction point in such a manner that the prediction point is relatively near the closest measuring point. In the invention, the prediction point is regarded as the measuring point, the predicted value at the prediction point is regarded as the measured value, and the predicted value is repeatedly determined in the vicinity of the inflection point. In this case, the next predicted value is determined by regarding the determined predicted value as the measured value. Specifically, the data can be predicted with high precision in the vicinity of the inflection point by relatively reducing the time interval from the prediction point to each of the n measuring points and determining the predicted value at the prediction point when the inflection point of the data is determined. Therefore, when the next predicted value is determined by using the determined predicted value, the prediction precision at future points can be enhanced.

When the inflection point of the data is determined, the previously determined predicted value may be regarded as the predicted value at the prediction point. For example, at the inflection point of the data the increasing data starts decreasing. In this case, if the prediction is performed as usual, the predicted value is influenced by the measured values at the past measuring points at which the data was increasing, and thus is determined larger than it actually is. Therefore, when the previous predicted value is determined to be the present predicted value, the predicted value can be shifted from increasing to decreasing quickly in the vicinity of the data inflection point. This prevents the variation of the predicted value from being delayed in time behind the variation of the measured value.

As aforementioned with respect to the prior art, when factors relating to a change in the air blowing in a cupola, there is a time-lag (called the dead time) before the changes appear in the temperatures and composition of the molten metal at the tap hole. However, the prediction device 1 of the embodiment enables the prediction of temperatures in the cupola to be more accurate. As shown in FIG. 1, the predicted values are continuously transmitted from the data output portion 16 to the air blow quantity controller 91. As a result, considering the time-lag, the air quantity in the cupola can be controlled properly.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

In the above-mentioned embodiment, by determining a predicted value at a closest measuring point, the difference between a predicted value and a measured value is calculated. On the basis of the difference, the time interval between sampled measuring times is optimized. However, optimization based on the difference can be used for degrees in interpolation formulas and the number of measured values to be averaged.

Also, without determining a predicted value at the closest measuring point , time intervals between measuring points or the degrees of the interpolation formulas can be optimized, on the basis of the change of measured values. For example, if the calculated gradient of measured values is larger than the predetermined one, the time interval between measuring points to be sampled can be shortened or a number n of measuring points to be sampled can increase so that the degree of the interpolation formula is increased. On the other hand, if the gradient is smaller than the predetermined one, the time interval between measuring points to be sampled can be lengthened or a number n of measuring points to be sampled can decrease so that the degree of the interpolation formula is decreased.

Furthermore, by finding the change of measured values, the gradient of the deviation between predicted values and measured values, and the change rate of the deviation, the inflection point of the data can be found when the data is observed in macro manner. In this case, the predicted values can be determined with the time intervals between sampled measuring points shortened relatively. Also, at this time, (under the condition that one prediction point is determined to be relatively close to a closest measuring point, and the predicted value is regarded as the measured value, and the prediction point is regarded as the measuring point), prediction for a new point to be predicted can be conducted. If the inflection point of the data is found, the previous predicted value can be one point to be predicted.

The prediction device 1 in the above-mentioned embodiment transmits predicted values to the air blow quantity controller 91 on the basis of the molten metal temperature in the cupola input from the thermosensor 90. However, by providing the humidity sensor 93, the air quantity sensor 94 and the wind pressure sensor 95, and sampling the humidity, the air quantity and the wind pressure input from these sensors, prediction can be conducted, and the predicted values can be transmitted to the air blow quantity controller 91.

The prediction device 1 in the above-mentioned embodiment is not limited for use only in predicting the change of the molten metal temperature in the cupola. Specifically, the device can be utilized for only control system having a time lag in response to the controlling. For example, by predicting required freeze quantity in a freezer, the operation of the freezer can be efficiently controlled. Also, the operation of a heat reservoir device or an air conditioning device can be controlled by predicting the change in electric use, when, for example, a contract limits the maximum amount of electric to be used for a certain period, so that the amount of electric could be under the maximum.

The prediction device 1 in the above-mentioned embodiment stores the program to conduct prediction process in ROM 12. The program could also be stored in a computer readable medium such as a floppy disk, a photo-magnetic disk, CD-ROM, a hard disk, and the like.

Although the preferred embodiment is shown as predicting physical quantity data such as the temperature of molten metal from the cupola, temperature, humidity, pressure, flow rate, and the like, one of ordinary skill in the art will appreciate that the method and process according to the invention could be used with other types of data, such as industrial properties like hardness or whiteness, calculated data like a ratio of temperature and humidity, or pattern data collected over longer time periods (weeks, months, etc.) without departing from the spirit and scope of the invention.

Also, although the preferred embodiment has been illustrated as using a Lagrangian interpolation formula, one of ordinary skill in the art will appreciate that other interpolation formulas, such as the Newton, the forward/backward Gregory-Newton, the Sterling, the Laplace-Emberet, a spline, a parametric spline, the Neville, and the trigonometric function interpolation formula, and the like, could be used without departing from the spirit and scope of the invention.

What is claimed is:

1. A method of predicting time-series continuous data comprising the steps of:

storing a plurality of measuring points and measured values at the measuring points of the time-series continuous data; and determining a predicted value at a prediction time point based on the stored measuring points and the stored measured values, with the determining stop being implemented by an interpolation formula In which the measured value at a closest measuring point, which is closest to the prediction point among the measuring points prior to the prediction point In time, is derived from the closest measuring point, and in which the Interpolation formula is prepared from:

n (a natural number) past measuring points before the closest measuring point, the measured values at the measuring points, the prediction point; and the predicted value at the prediction point.

2. The method of predicting time-series continuous data of claim 1 further comprising a step of optimizing a degree of the interpolation formula by varying the number n of the measuring points.

3. The method of predicting time-series continuous data according to claim 2, wherein when the variation of the data is the predetermined value or larger, the degree of the interpolation formula is raised by increasing the number n of the measuring points, and when the variation of the data is smaller than the predetermined value, the degree of the interpolation formula is lowered by decreasing the number n of the measuring points.

4. The method of predicting the time-series continuous data according to claim 3 wherein when the variation of the data is the predetermined value or larger, the degree of the interpolation formula is set to at least three, and when the variation of the data is smaller than the predetermined value, the degree of the interpolation formula is set to one of one and two.

5. The method of predicting the time-series continuous data according to claim 2 wherein the step of optimizing comprises the steps of:
predetermining a plurality of optimization values at the closest measuring point by using corresponding interpolation formulas having different degrees; and
determining a predicted value at the prediction point by using the interpolation formula having the same degree as the degree of the interpolation formula which reduces difference data, the difference data being based on a difference between the predicted value and the actual measured value.

6. The method of predicting the time-series continuous data according to claim 1 further comprising a step of optimizing a time interval from the prediction point to each of the n measuring points.

7. The method of predicting the time-series continuous data of claim 6 wherein when the variation of the data is the predetermined value or larger, the time interval is enlarged in total, and when the variation of the data is smaller than the predetermined value, the time interval is reduced in total.

8. The method of predicting the time-series continuous data of claim 6 wherein the step of optimizing comprises the steps of:
repeatedly determining the predicted value at the closest measuring point;
calculating the difference data based on the difference between the predicted value and the measured value at the closest measuring point;
calculating the time interval from the closest measuring point in such a manner that the difference data is further reduced;
using the time interval as the time interval from the prediction point; and
determining the predicted value at the prediction point.

9. The method of predicting the time-series continuous data of claim 1 wherein the measured values at n+1 measuring points including the closest measuring point are average measured values which are obtained by averaging measured values at m measuring points, m being an integer of at least two.

10. The method of predicting the time-series continuous data of claim 9 wherein the number m of the measured values to be averaged is optimized.

11. The method of predicting the time-series continuous data of claim 1 further comprising the steps of:
predetermining the predicted value at the closest measuring point;
calculating the difference data based on the difference between the predicted value and the measured value at the closest measuring point; and
correcting the predicted value at the prediction point.

12. The method of predicting the time-series continuous data of claim 1 further comprising the steps of:
predetermining the predicted value at each measuring point;
calculating the difference data based on the difference between the predicted value and the measured value at the measuring point;
storing the difference data of the measuring point;
determining the predicted value at the prediction point;
determining predicted difference data at the prediction point; and
correcting the predicted value at the prediction time based on the determined predicted difference data.

13. The method of predicting the time-series continuous data of claim 1 wherein when an inflection point of the data is determined, the time interval from the prediction point to each of the n measuring points is reduced to determine the predicted value at the prediction point.

14. The method of predicting the time-series continuous data of claim 13 wherein the prediction point is regarded as the measuring point, the predicted value at the prediction point is regarded as the measured value, and the predicted value is repeatedly determined in the vicinity of the inflection point.

15. A control method utilizing the method of predicting time series continuous data according to claim 1 comprising the steps of:
determining the predicted value at the prediction point of data entered from a control system; and
controlling the control system based on the determined predicted value.

16. The method of predicting time-series continuous data of claim 1, wherein the method of predicting time-series continuous data is implemented in a computer program and is provided on a computer readable memory medium.

17. A method of predicting time-series continuous data comprising the steps of:
capturing and storing a time-series of values;
sampling a closest value at a closest measuring point, the closest measuring point being the time point nearest in time to a prediction time point, the prediction time point having a corresponding value to be predicted;
providing an interpolation formula f(n) having a degree n, wherein the interpolation formula satisfies the relationship "closest value=f(closest measuring point)";
sampling n other prior values;
applying the n other prior values, the closest value and the predicted value at the prediction time point to the Interpolation formula; and
solving the interpolation formula to determine the predicted value.

18. A time-series continuous data prediction controller comprising:
a prediction unit comprising:
a central processing unit (CPU) having a clock generating portion;
at least one read only memory (ROM) unit communicatively connected to the CPU;
at least one random access memory (RAM) unit communicatively connected to the central processing unit (CPU);
at least one data input unit having at least one sensor input port and at least one CPU input/output port, the data input unit being communicatively connected to the central processing unit (CPU) via the at least one CPU input/output port; and
at least one data output unit having at least one controller output port and at least one data output unit CPU input/output port, the at least one data output unit being communicatively connected to the central processing unit (CPU) via the at least one data output unit CPU input/output port;
at least one sensor communicatively connected to the prediction unit via the at least one sensor Input port of the at least one data input unit; and at least one physical-quantity controller communicatively connected to the prediction unit via the at least one controller output port of the at least one data output unit;

whereby the prediction unit captures data from the at least one sensor, predicts future values based on the data, user input, If any, and a program stored in the at least one ROM or RAM unit by implementation of an interpolation formula in which the measured value at the closest measuring point, which is closest to the prediction point among the measuring points prior to the prediction point in time, is derived from the closest measuring point, and in which the Interpolation formula is prepared from:

n (a natural number) past measuring points before the closest measuring point, the measured values at the measuring points, the prediction point, and the predicted value at the prediction point, and accordingly controlling the at least one physical-quantity controller.

* * * * *